(12) United States Patent
Shin

(10) Patent No.: US 12,415,425 B2
(45) Date of Patent: Sep. 16, 2025

(54) ELECTRIC VEHICLE CHARGING CONTROLLER AND ELECTRIC VEHICLE CHARGER COMPRISING SAME

(71) Applicant: LG INNOTEK CO., LTD., Seoul (KR)

(72) Inventor: Kwang Seob Shin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 464 days.

(21) Appl. No.: 17/910,961

(22) PCT Filed: Mar. 8, 2021

(86) PCT No.: PCT/KR2021/002812
§ 371 (c)(1),
(2) Date: Sep. 12, 2022

(87) PCT Pub. No.: WO2021/182815
PCT Pub. Date: Sep. 16, 2021

(65) Prior Publication Data
US 2023/0138878 A1 May 4, 2023

(30) Foreign Application Priority Data
Mar. 13, 2020 (KR) .................. 10-2020-0031327

(51) Int. Cl.
*B60L 53/60* (2019.01)
*B60L 3/00* (2019.01)
*B60L 53/14* (2019.01)

(52) U.S. Cl.
CPC ............. *B60L 3/0069* (2013.01); *B60L 53/14* (2019.02); *B60L 53/60* (2019.02)

(58) Field of Classification Search
CPC ......... B60L 53/14; B60L 53/60; B60L 3/0069
(Continued)

(56) References Cited

U.S. PATENT DOCUMENTS

2013/0320920 A1* 12/2013 Jefferies ............. G08B 13/1418
320/109
2019/0148957 A1* 5/2019 Masuda .................. B60L 53/66
320/127
2020/0044464 A1 2/2020 Sasu

FOREIGN PATENT DOCUMENTS

KR 10-2017-0072993 A 6/2017
KR 10-2017-0094869 A 8/2017
(Continued)

*Primary Examiner* — Nathaniel R Pelton
(74) *Attorney, Agent, or Firm* — Birch, Stewart, Kolasch & Birch, LLP

(57) ABSTRACT

An electric vehicle charger according to an embodiment of the present invention comprises an electric vehicle charging controller comprising an inlet comprising: an earthing pin coupled to a coupler and configured to connect a first earthing line connected to a first earthing power source in an electric vehicle power supply device and a second earthing line connected to a second earthing power source in an electric vehicle; a first signal pin coupled to the coupler and configured to connect a first signal line in the electric vehicle power supply device and a first signal line in the electric vehicle; and a second signal pin coupled to the coupler and configured to connect a second signal line in the electric vehicle power supply device and a second signal line in the electric vehicle, and a sensing unit connected to the electric vehicle power supply device through a third signal line and a fourth signal line so as to receive a third signal and a fourth signal. The inlet comprises a signal unit disposed between the second signal line and the third signal line, and configured to generate a second signal and then transmit same to the electric vehicle charging controller. The sensing unit comprises: a first processing unit electrically connected to the electric vehicle power supply device through the third signal line and the fourth signal line, and configured to receive the third signal and the fourth signal from the electric (Continued)

vehicle power supply device; a second processing unit for receiving the third signal and the fourth signal that a first sensing unit has received, and then transmitting same to a control unit; and an insulation unit for electrically isolating the first processing unit and the second processing unit from each other.

10 Claims, 14 Drawing Sheets

(58) Field of Classification Search
USPC .......................................................... 320/109
See application file for complete search history.

(56) References Cited

FOREIGN PATENT DOCUMENTS

| | | |
|---|---|---|
| KR | 10-2018-0029321 A | 3/2018 |
| WO | WO 2018/201764 A1 | 11/2018 |

* cited by examiner

[FIG. 1]
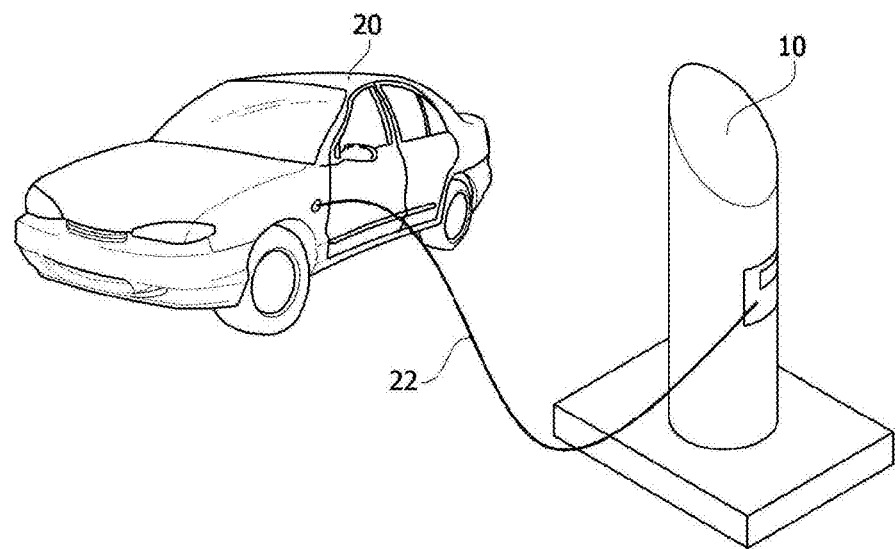

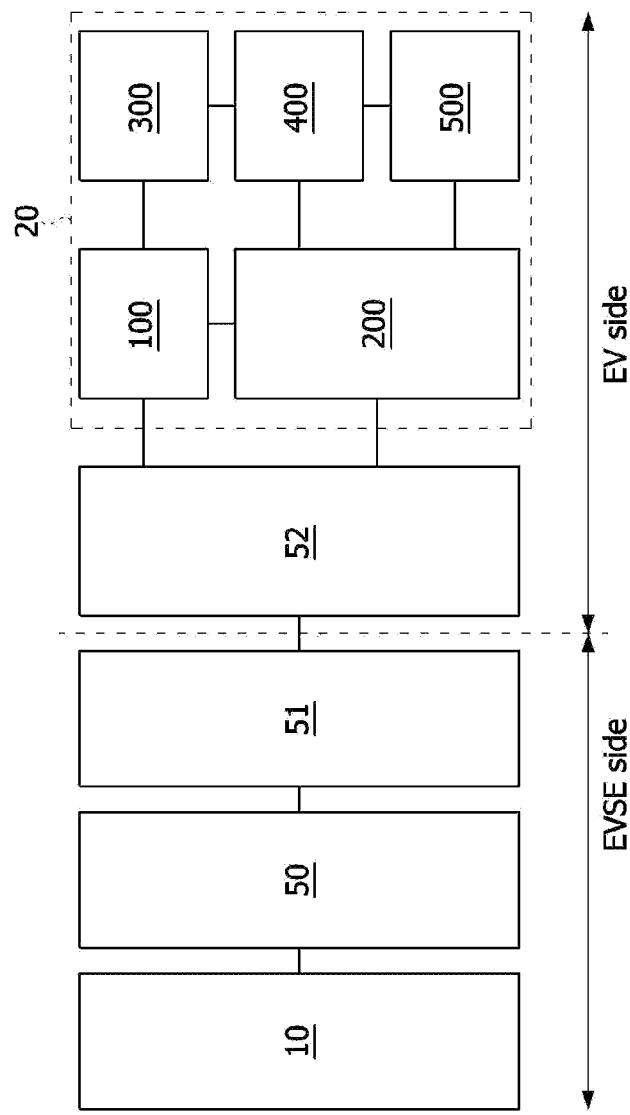
[FIG. 2]

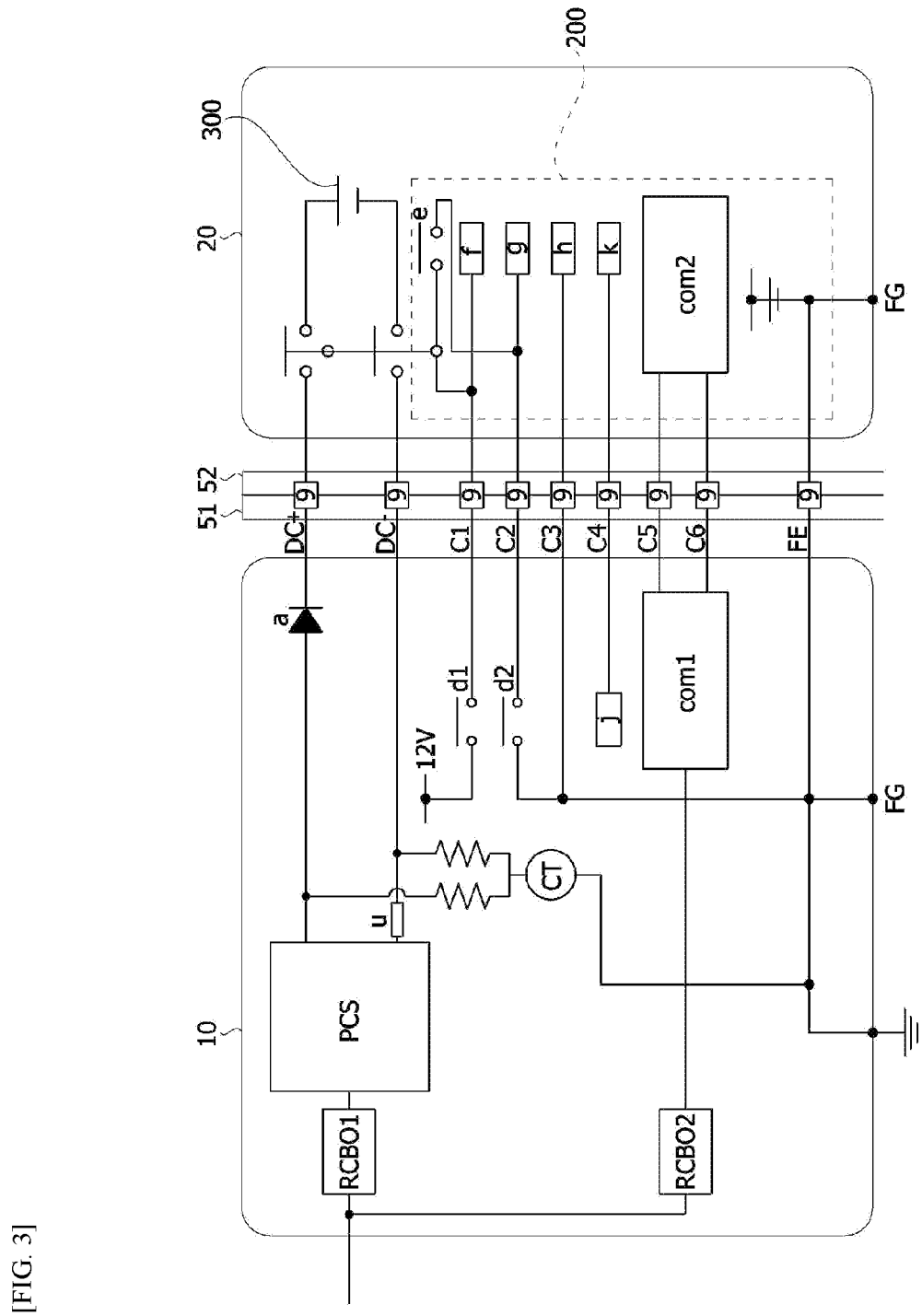
[FIG. 3]

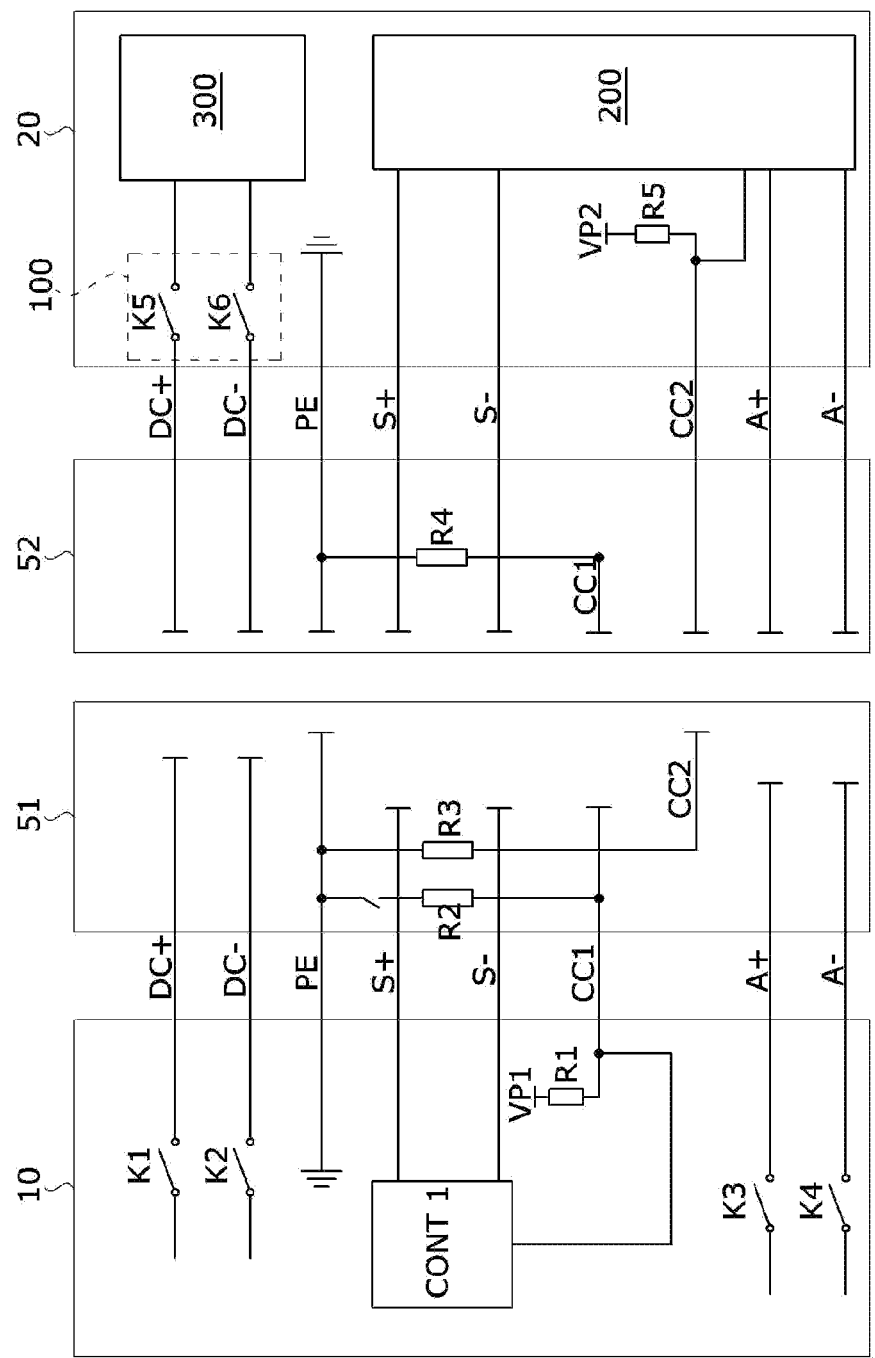
[FIG. 4]

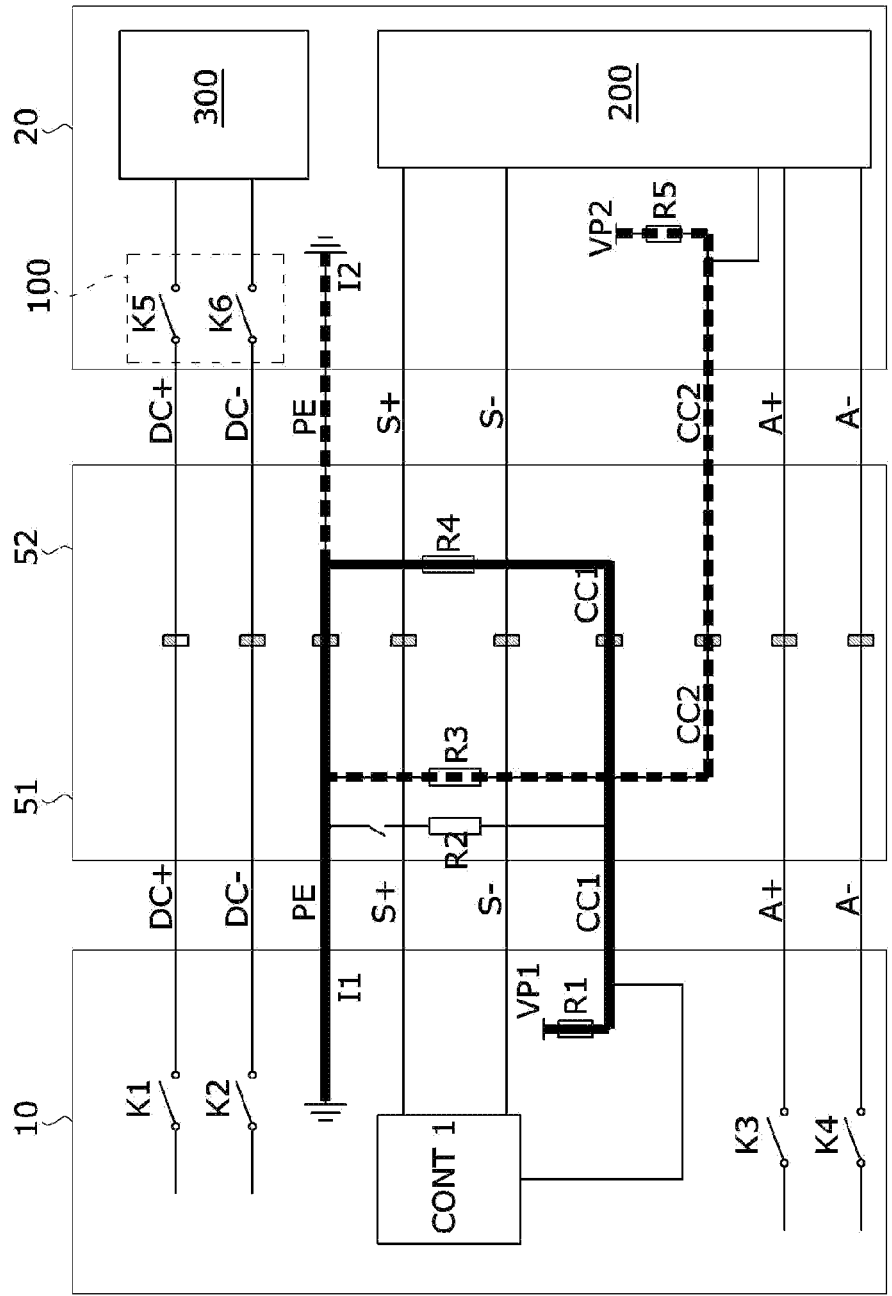
[FIG. 5]

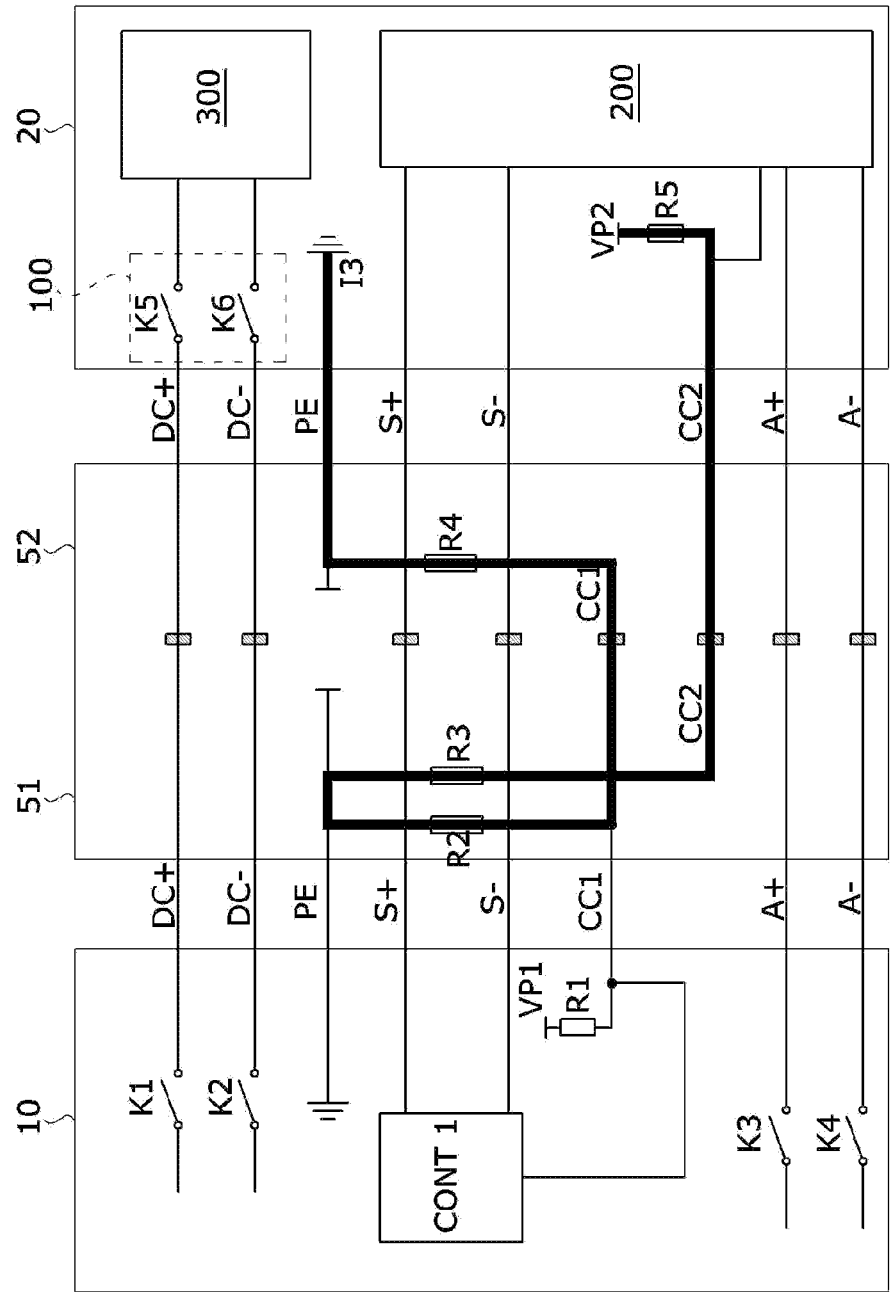
[FIG. 6]

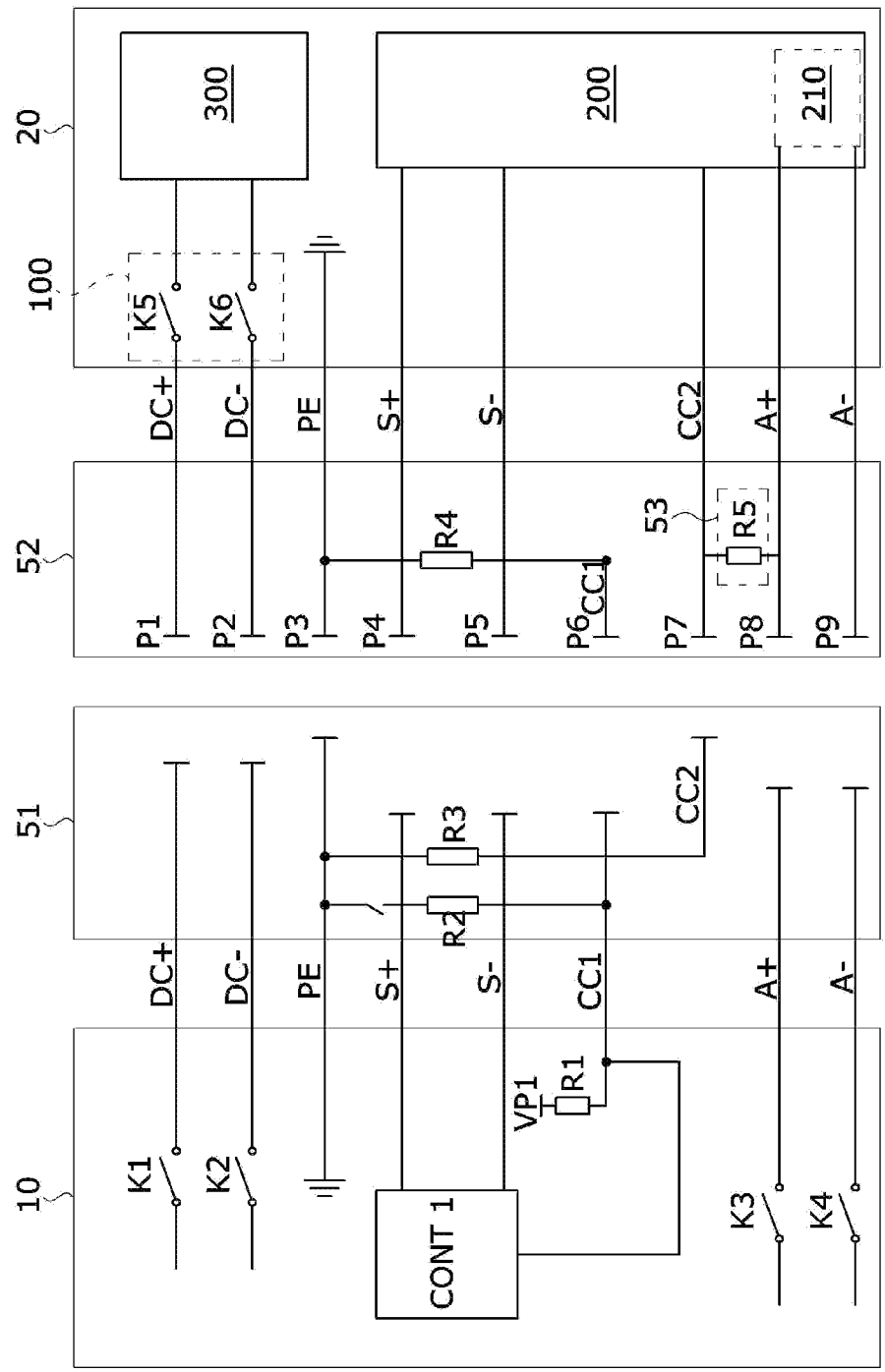
[FIG. 7]

[FIG. 8]
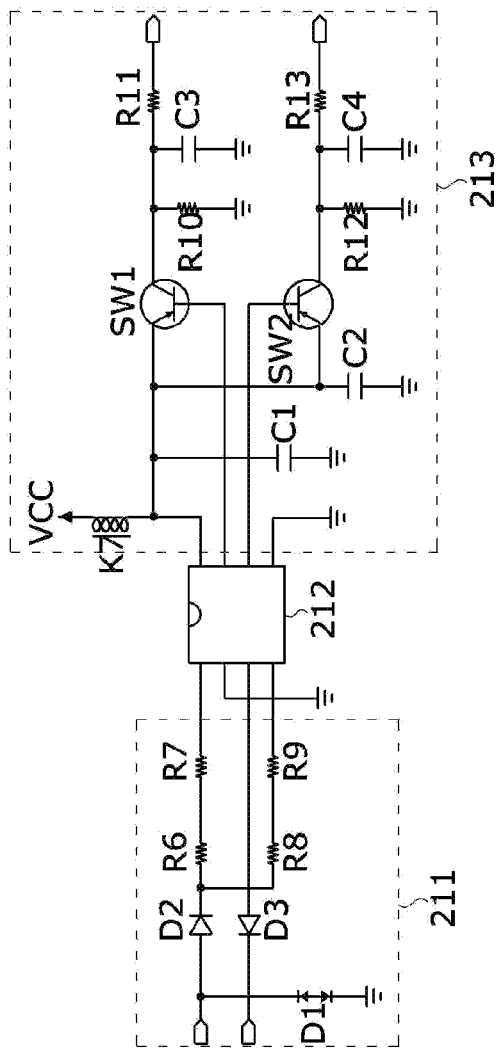

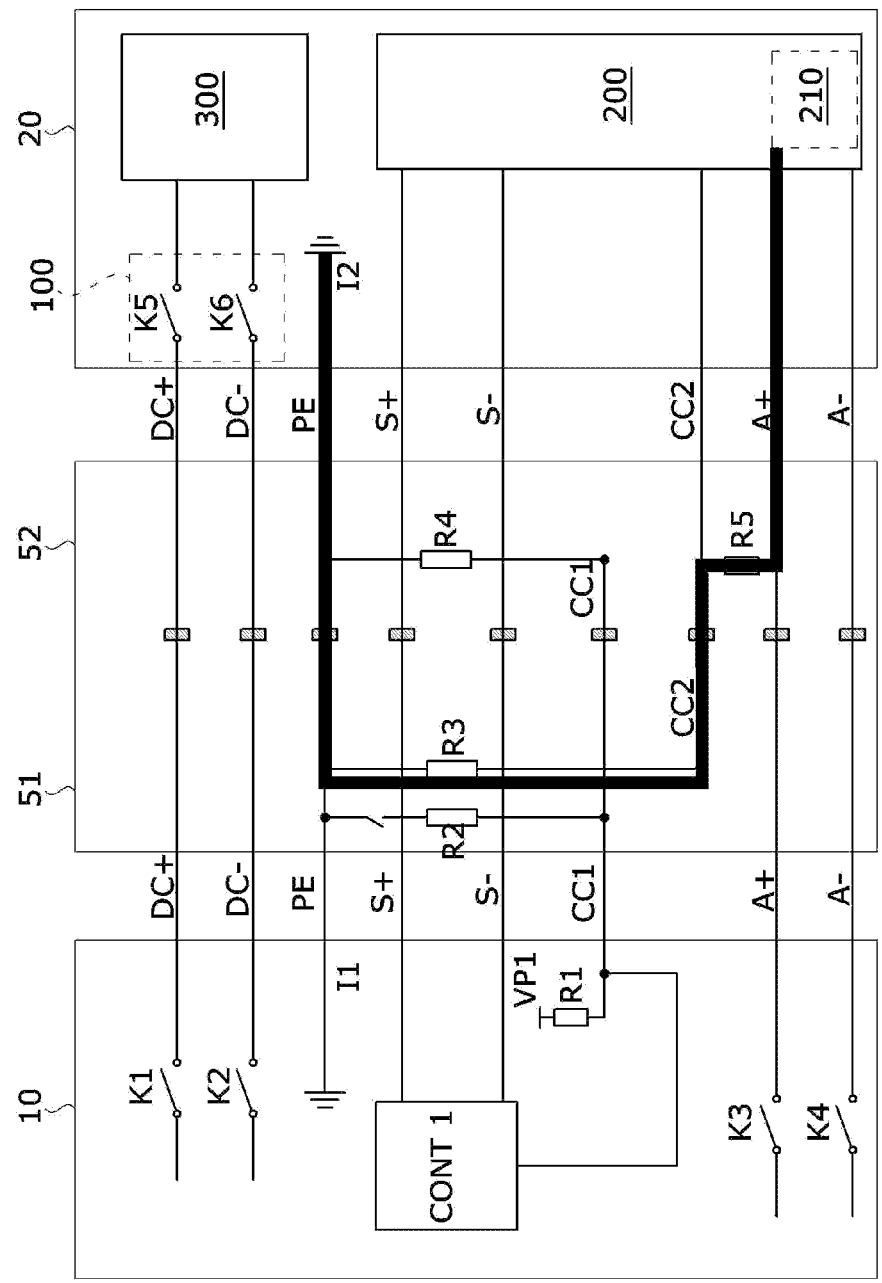
[FIG. 9]

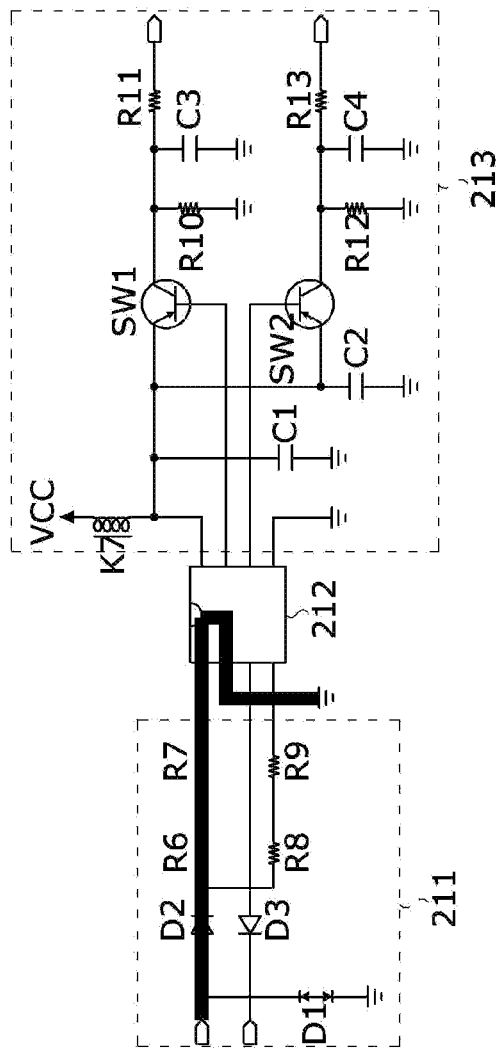
[FIG. 10]

[FIG. 11]
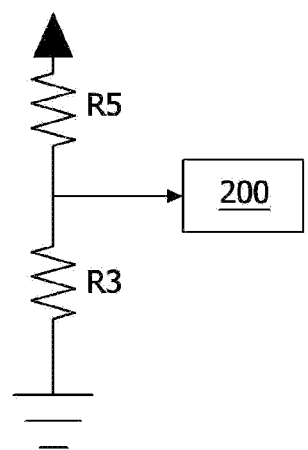 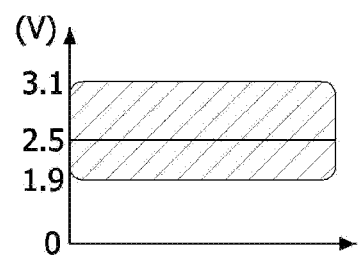
(a)           (b)

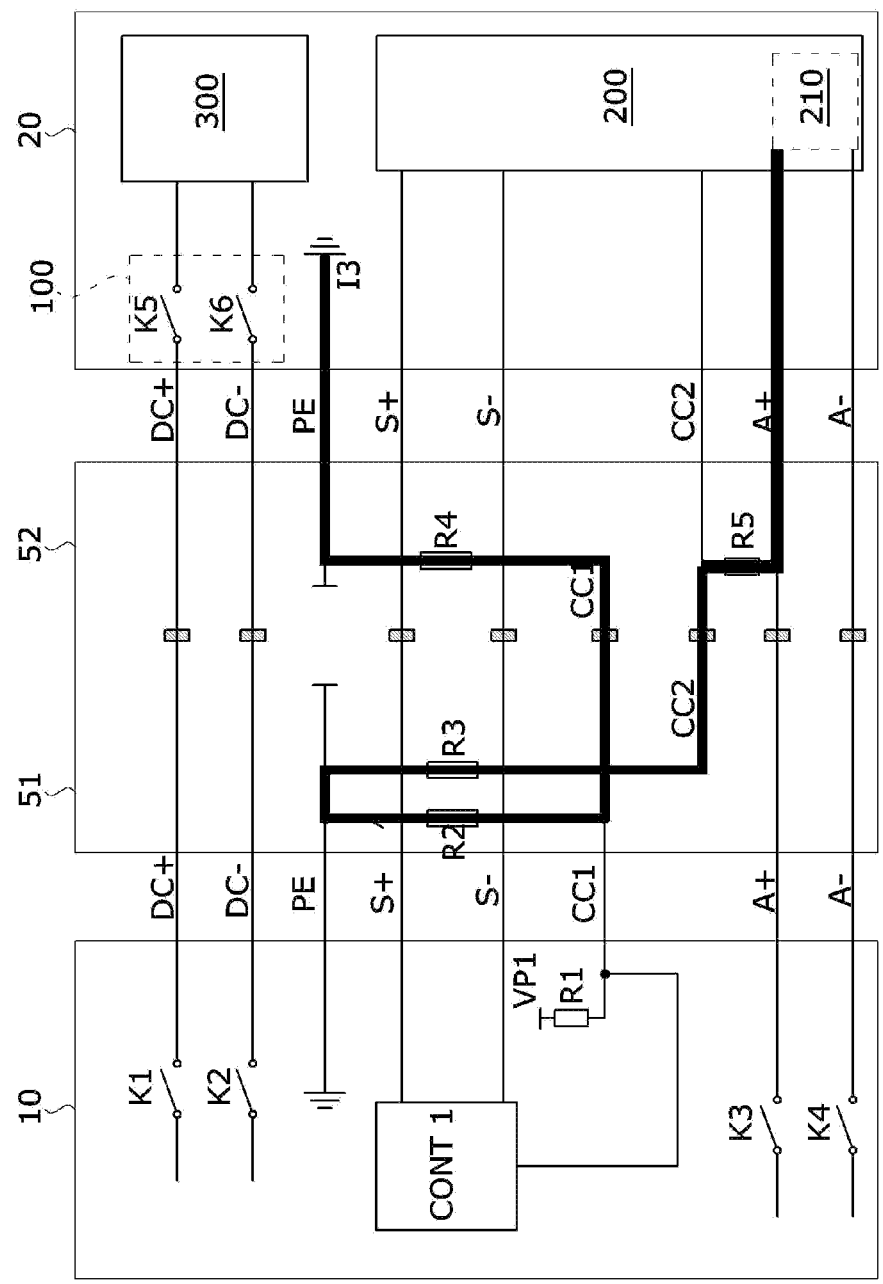
[FIG. 12]

[FIG. 13]
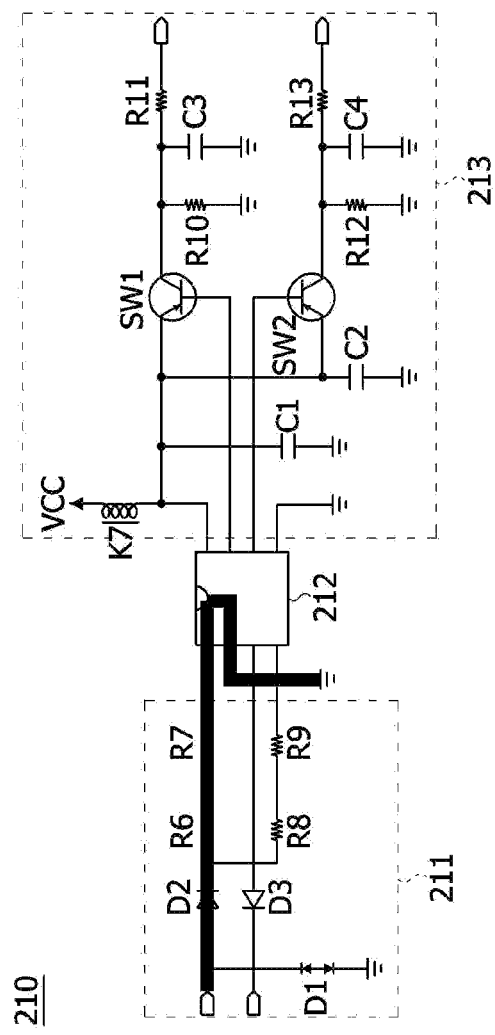

[FIG. 14]
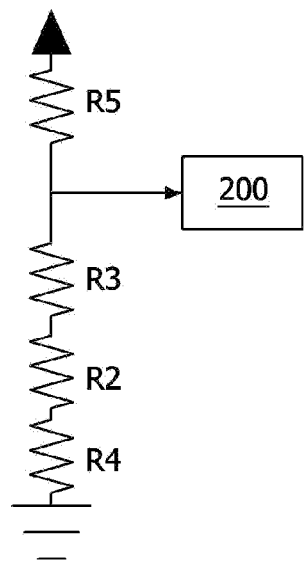
(a)
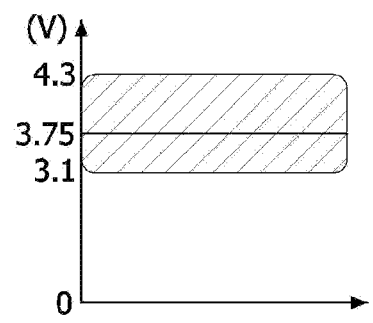
(b)

ELECTRIC VEHICLE CHARGING CONTROLLER AND ELECTRIC VEHICLE CHARGER COMPRISING SAME

CROSS REFERENCE TO RELATED APPLICATIONS

This application is the National Phase of PCT/KR2021/002812 filed on Mar. 8, 2021, which claims priority under 35 U.S.C. § 119 (a) to Patent Application No. 10-2020-0031327 filed in the Republic of Korea on Mar. 13, 2020, all of which are hereby expressly incorporated by reference into the present application.

TECHNICAL FIELD

An embodiment relates to an electric vehicle charging controller and an electric vehicle charger including the same.

BACKGROUND ART

Eco-friendly vehicles such as electric vehicles (EVs) or plug-in hybrid electric vehicles (PHEVs) use electric vehicle supply equipment (EVSE) installed at a supply to charge a battery.

To this end, an electric vehicle charging controller (EVCC) is mounted in the EV, communicates with the EV and the EVSE, and controls a charging of the EV.

For example, when the EVCC receives a signal instructing the start of charging from the EV, the EVCC may control the start of charging, and when the EVCC receives a signal instructing the end of charging from the EV, the EVCC may control the end of charging.

A charging method of an EV may be classified into fast charging and slow charging according to a charging time. In the case of the fast charging, a battery is charged by a direct current (DC) supplied from a charger, and in the case of the slow charging, the battery is charged by an alternating current (AC) supplied to the charger. Accordingly, a charger used for the fast charging is called a fast charger or a DC charger, and a charger used for the slow charging is called a slow charger or an AC charger.

Since an electric vehicle charging system uses high-voltage power, various processes are present to increase safety. For example, a charging process is not performed even when some connection pins are not connected by detecting whether a connector and an inlet are close to each other (coupled to each other). In particular, performing equipotential bonding between EVSE and an EV is a very important safety issue.

However, since conventional electric vehicle charging systems only determine whether the connector and the inlet are close to each other and have no method of determining whether an earthing line is connected between the EVSE and the EV, there is a need for a method for this.

Technical Problem

An embodiment is directed to providing an electric vehicle charging controller, which may determine whether an earthing line is connected between electric vehicle supply equipment and an electric vehicle, and an electric vehicle charger including the same.

The objects of the embodiments are not limited thereto, and objects or effects that may be identified from the configurations or embodiments to be described below will also be included.

Technical Solution

An electric vehicle charger according to an embodiment of the present invention includes an electric vehicle charging controller including: an inlet including an earthing pin coupled to a coupler and configured to connect a first earthing line connected to a first earthing power source at electric vehicle supply equipment and a second earthing line connected to a second earthing power source at an electric vehicle, a first signal pin coupled to the coupler and configured to connect a first signal line at the electric vehicle supply equipment and a first signal line at the electric vehicle, and a second signal pin coupled to the coupler and configured to connect a second signal line at the electric vehicle supply equipment and a second signal line at the electric vehicle; and a sensing unit connected to the electric vehicle supply equipment through a third signal line and a fourth signal line so as to receive a third signal and a fourth signal, wherein the inlet includes a signal unit disposed between the second signal line and the third signal line, and configured to generate a second signal and transmit the second signal to the electric vehicle charging controller, and the sensing unit includes: a first processing unit electrically connected to the electric vehicle supply equipment through the third signal line and the fourth signal line, and configured to receive the third signal and the fourth signal from the electric vehicle supply equipment; a second processing unit configured to receive the third signal and the fourth signal that the first processing unit has received, and transmit the third signal and the fourth signal to a control unit; and an insulation unit configured to electrically isolate the first processing unit and the second processing unit.

The insulation unit may convert the third signal and the fourth signal received from the first processing unit from an electrical signal to an optical signal, and then convert the third signal and the fourth signal from the optical signal to the electrical signal to transmit the converted third signal and fourth signal to the second processing unit.

The insulation unit may be electrically connected to the second earthing power source.

The insulation unit may include an optocoupler.

The first processing unit may include: a first diode configured to control a magnitude of a voltage of the third signal received through the third signal line to a preset value or less; a second diode configured to block a reverse voltage applied to the electric vehicle supply equipment through the third signal line; and a third diode configured to block a reverse voltage applied to the electric vehicle charging controller through the fourth signal line.

The signal unit may include a first resistor having a first end connected to the third signal line, and a second end connected to the second signal line.

The coupler may include a second resistor having a first end connected to the second signal line, and a second end connected to the earthing line, and when the first earthing line and the second earthing line are connected, a current passing through the first resistor and the second resistor may be generated.

The coupler may include a third resistor having a first end connected to the earthing line, and a second end connected to the first signal line, the inlet may include a fourth resistor having a first end connected to the first signal line, and a second end connected to the earthing line, and the control unit may generate a current passing through the first to fourth resistors when the first earthing line and the second earthing line are open.

When a magnitude of a voltage of the second signal is greater than a first voltage value and smaller than or equal to a second voltage value, the control unit may determine that the first earthing line and the second earthing line are connected.

When the magnitude of the voltage of the second signal is greater than the second voltage value and smaller than a third voltage value, the control unit may determine that the earthing line at the electric vehicle supply equipment and the earthing line at the electric vehicle are not connected.

An electric vehicle charging controller according to an embodiment of the present invention includes a sensing unit having a third signal line and a fourth signal line connected to electric vehicle supply equipment through an inlet and configured to receive a third signal and a fourth signal, wherein the sensing unit includes: a first processing unit electrically connected to the electric vehicle supply equipment through the third signal line and the fourth signal line, and configured to receive the third signal and the fourth signal from the electric vehicle supply equipment; a second processing unit configured to receive the third signal and the fourth signal received by the first processing unit and transmit the third signal and the fourth signal to a control unit; and an insulation unit configured to electrically isolate the first processing unit and the second processing unit, and the inlet includes: an earthing pin coupled to a coupler and configured to connect a first earthing line connected to a first earthing power source at the electric vehicle supply equipment and a second earthing line connected to a second earthing power source at the electric vehicle; a first signal pin coupled to the coupler and configured to connect a first signal line at the electric vehicle supply equipment and a first signal line at the electric vehicle; a second signal pin coupled to the coupler and configured to connect a second signal line at the electric vehicle supply equipment and a second signal line at the electric vehicle; and a signal unit disposed between the second signal line and the third signal line, and configured to generate a second signal and transmit the second signal to the electric vehicle charging controller.

The signal unit may include a first resistor having a first end connected to the third signal line, and a second end connected to the second signal line.

The coupler may include a second resistor having a first end connected to the second signal line, and a second end connected to the earthing line, and when the first earthing line and the second earthing line are connected, a current passing through the first resistor and the second resistor may be generated.

The coupler may include a third resistor having a first end connected to the earthing line, and a second end connected to the first signal line, the inlet may include a fourth resistor having a first end connected to the first signal line, and a second end connected to the earthing line, and the control unit may generate a current passing through the first to fourth resistors when the first earthing line and the second earthing line are open.

Advantageous Effects

According to embodiments, it is possible to determine whether an earthing line is disconnected in an electric vehicle charging system.

Various and beneficial advantages and effects of the present invention are not limited to the above-described contents, and will be more easily understood in the process of describing specific embodiments of the present invention.

DESCRIPTION OF DRAWINGS

FIG. 1 is a view for describing an electric vehicle charging system according to an embodiment of the present invention.

FIG. 2 is a view showing a configuration of the electric vehicle charging system according to the embodiment of the present invention.

FIG. 3 is a view showing a circuit configuration of an electric vehicle charging system according to one embodiment of the present invention.

FIG. 4 is a view showing a circuit configuration of an electric vehicle charging system according to another embodiment of the present invention.

FIGS. 5 and 6 are views for describing a process of detecting an earthing line open state in the electric vehicle charging system in FIG. 4.

FIG. 7 is a view schematically showing the electric vehicle charging system according to the embodiment of the present invention.

FIG. 8 is a view showing a circuit configuration of a sensing unit according to the embodiment of the present invention.

FIGS. 9 and 10 are views for describing a configuration of a closed loop when a first earthing line and a second earthing line according to the embodiment of the present invention are connected.

FIG. 11 is a view for describing a sensing signal received in a control unit according to FIGS. 9 and 10.

FIGS. 12 and 13 are views for describing a configuration of the closed loop when the first earthing line (PE) and the second earthing line (PE) according to the embodiment of the present invention are open.

FIG. 14 is a view for describing a sensing signal received in the control unit according to FIGS. 12 and 13.

MODES OF THE INVENTION

Hereinafter, exemplary embodiments of the present invention will be described in detail with reference to the accompanying drawings.

However, the technical spirit of the present invention is not limited to some of the described embodiments but may be implemented in various different forms, and one or more of the components may be used by being selectively coupled and substituted without departing from the scope of the technical spirit of the present invention.

In addition, terms (including technical and scientific terms) used in the embodiments of the present invention may be construed as the meaning that may be generally understood by those skilled in the art to which the present invention pertains unless clearly and especially defined and described, and generally used terms such as terms defined in dictionaries may be construed in consideration of the contextual meaning of the related art.

In addition, the terms used in the embodiments of the present invention are to describe the embodiments and are not intended to limit the present invention.

In this specification, the singular form may also include the plural form unless otherwise specified in the phrase, and when it is described as "at least one (or one or more) of A and B, C", it may include one or more of all possible combinations of A, B, and C.

In addition, in describing the components of the embodiment of the present invention, terms such as first, second, A, B, (a), and (b) may be used.

These terms are only intended to distinguish the component from other components, and the essence, sequence, or order of the corresponding components is not limited by the terms.

In addition, when it is described that a component is "connected", "coupled", or "joined" to another component, this may include a case in which the component is not only directly connected, coupled, or joined to another component, but also a case in which the component is "connected", "coupled", or "joined" to another component through other components interposed therebetween.

In addition, when it is described as being formed or disposed on "top (above) or bottom (below)" of each component, the top (above) or bottom (below) includes not only a case in which two components come into direct contact with each other but also a case in which one or more other components are formed or disposed between the two components. In addition, when expressed as "top (above) or bottom (below)", this may also include the meaning of not only an upward direction but also a downward direction with respect to one component.

FIG. 1 is a view for describing an electric vehicle charging system according to an embodiment of the present invention.

An electric vehicle charging system according to an embodiment of the present invention may refer to a system for charging a battery of an electric vehicle operated using electric energy as power.

Referring to FIG. 1, the electric vehicle charging system according to the embodiment of the present invention may include electric vehicle supply equipment (EVSE) 10 and an electric vehicle (EV) 20.

The electric vehicle supply equipment 10 is a facility for supplying AC or DC power, and may be disposed in a supply or in a home, and may also be implemented to be portable. The electric vehicle supply equipment 10 may be used interchangeably with a supply, an AC supply, a DC supply, and the like. The electric vehicle supply equipment 10 may receive the AC or DC power from a main power source. The main power source may include a power system and the like. The electric vehicle supply equipment 10 may transform or convert the AC or DC power received from the main power source to supply the transformed or converted AC or DC power to the electric vehicle 20.

The electric vehicle 20 refers to a vehicle operated by receiving all or part of energy from a mounted battery. The electric vehicle 20 may include a plug-in hybrid electric vehicle (PHEV) that travels using an engine using fossil fuel together as well as an electric vehicle that travels only with electric energy charged in the battery. The battery provided in the electric vehicle 20 may be charged by receiving power from the electric vehicle supply equipment 10.

FIG. 2 is a view showing a configuration of the electric vehicle charging system according to the embodiment of the present invention.

The electric vehicle charging system according to the embodiment of the present invention may include the electric vehicle supply equipment (EVSE) 10, a cable 50, a connector 51, an inlet 52, a junction box 100, an electric vehicle charging controller (EVCC) 200, a battery 300, a battery management system (BMS) 400, and an electric power control unit (EPCU) 500. A configuration included in the electric vehicle charging system may be classified into a configuration of the electric vehicle supply equipment 10 side (EVSE side) and a configuration of the electric vehicle 20 side (EV side). The configuration of the electric vehicle supply equipment 10 side may include the electric vehicle supply equipment 10, the cable 50, and the connector 51. The configuration of the electric vehicle side may include the inlet 52, the junction box 100, the electric vehicle charging controller 200, the battery 300, the battery management system 400, and the electric power control unit 500. The classification is for convenience of description and is not limited thereto.

First, the electric vehicle supply equipment 10 supplies power for charging the battery 300 of the electric vehicle. The electric vehicle supply equipment 10 may transmit power received from the main power source (e.g., the power system) to the electric vehicle 20. At this time, the electric vehicle supply equipment 10 may reduce or convert the power received from the main power source to supply the reduced or converted power to the electric vehicle 20. According to one embodiment, when the electric vehicle supply equipment 10 supplies AC power to the electric vehicle 20, the electric vehicle supply equipment 10 may transform the AC power received from the main power source and supply the transformed AC power to the electric vehicle 20. In another embodiment, when the electric vehicle supply equipment 10 supplies DC power to the electric vehicle 20, the electric vehicle supply equipment 10 may convert AC power received from the main power source into DC power to supply the DC power to the electric vehicle 20. In order to transform or convert power, the electric vehicle supply equipment 10 may include a power conversion unit. According to the embodiment, the electric vehicle supply equipment 10 may include a rectifier, an isolation transformer, an inverter, a converter, and the like.

The electric vehicle supply equipment 10 may include a charging control unit configured to transmit and receive various control signals required for charging the battery 300 of the electric vehicle 20 and control a battery charging process. The charging control unit may transmit and receive a control signal to and from the electric vehicle 20 and perform the battery charging process. The control signal may include information such as ready to charge, end of charging, proximity detection, and the like. The charging control unit may include a communication unit configured to communicate with the electric vehicle 20. The communication unit may communicate with the electric vehicle 20 using power line communication (PLC), a controller area network (CAN), or the like. The communication unit may also be included in the charging control unit or may also be configured separately.

Next, the cable 50, the connector 51, and the inlet 52 electrically connect the electric vehicle supply equipment 10 and the electric vehicle.

The cable 50 transmits power and signals between the electric vehicle supply equipment 10 and the electric vehicle 20. The cable 50 may include a power line configured to transmit power, a signal line configured to transmit a control signal related to charging, an earthing line configured to connect with an earthing, and the like.

The cable 50 is connected to the electric vehicle supply equipment 10. According to one embodiment, the electric vehicle supply equipment 10 and the cable 50 may be directly connected without a separate connection configuration. According to another embodiment, the electric vehicle supply equipment 10 and the cable 50 may be connected by coupling a socket-outlet provided in the electric vehicle supply equipment 10 and a plug provided in the cable 50.

The connector 51 may be connected to the cable 50, and the inlet 52 may be provided in the electric vehicle 20. The connector 51 and the inlet 52 may be grouped together and named as a coupler. The connector 51 and the inlet 52 have a structure that may be coupled to each other, and the electric vehicle 20 and the electric vehicle supply equipment 10 may be electrically connected by coupling the connector 51 and the inlet 52. The inlet 52 and the connector 51 may be not only directly connected, but also connected through an adapter.

The connector 51 and the inlet 52 may include a plurality of pins that may be coupled to each other. For example, one of the plurality of pins may be a pin for a CP port through which a control pilot (CP) signal is transmitted between the electric vehicle supply equipment 10 and the electric vehicle charging controller 200, another one may be a pin for a proximity detection (PD) port that senses whether the connector 51 and the inlet 52 are close to each other, and still another one may be a pin for a protective earth (PE) port connected to a protective earthing of the electric vehicle supply equipment 10. Still another one of the plurality of pins may be a pin for driving a motor configured to open a fuel flap, still another one may be a pin for sensing the motor, still another one may be a pin for sensing a temperature, still another one may be a pin for sensing a light emitting diode (LED), and still another one may be a pin for CAN communication. One of the plurality of pins may be a pin for a voltage line applied from a collision detection sensor in the electric vehicle 20, another one may be a battery pin for supplying charging power to the electric vehicle 20, and still another one may be a pin for high-voltage protection. However, the number and functions of pins are not limited thereto, and may be variously modified.

The junction box 100 transmits power supplied from the electric vehicle supply equipment 10 to the battery 300. The power supplied from the electric vehicle supply equipment 10 is a high voltage, and when the power is directly supplied to the battery 300, the battery 300 may be damaged due to an inrush current. The junction box 100 may include at least one relay to prevent damage to the battery due to the inrush current.

The electric vehicle charging controller 200 may control part or all of a process related to charging the battery of the electric vehicle 20. The electric vehicle charging controller 200 may be referred to as an electric vehicle communication controller (EVCC).

The electric vehicle charging controller 200 may communicate with the electric vehicle supply equipment 10. The electric vehicle charging controller 200 may transmit and receive a control command related to the battery charging process from the electric vehicle supply equipment 10. According to one embodiment, the electric vehicle charging controller 200 may communicate with the charging control unit provided in the electric vehicle supply equipment 10, and transmit and receive the control command related to the battery charging process from the charging control unit.

The electric vehicle charging controller 200 may communicate with the electric vehicle 20. The electric vehicle charging controller 200 may receive the control command related to the battery charging process from the electric vehicle 20. According to one embodiment, the electric vehicle charging controller 200 may communicate with the battery management system 400 of the electric vehicle 20, and also receive the control command related to the battery charging process from the battery management system 400. According to another embodiment, the electric vehicle charging controller 200 may communicate with the electric power control unit 500 of the electric vehicle 20, and receive the control command related to the battery charging process from the electric power control unit 500.

The electric vehicle charging controller 200 may include a micro controller unit (MCU), a communication unit, a relay unit, and the like to perform the above functions.

The battery management system 400 manages an energy state of the battery 300 in the electric vehicle 20. The battery management system 400 may monitor a usage status of the battery 300 and perform a control for efficient energy distribution. For example, the battery management system 400 may transmit an available power status of the electric vehicle 20 to a vehicle control unit and the inverter for efficient use of energy. As another example, the battery management system 400 may correct a voltage deviation for each cell of the battery 300 or drive a cooling fan to maintain the battery 300 at an appropriate temperature.

The electric power control unit 500 is a unit configured to control the overall movement of the electric vehicle including a control of the motor. The electric power control unit 500 may include a motor control unit (MCU), a low voltage DC-DC converter (LDC), and a vehicle control unit (VCU). The motor control unit may be referred to as an inverter. The motor control unit may receive DC power from the battery and convert the DC power into three-phase AC power, and control the motor according to a command from the vehicle control unit. The low voltage DC converter may convert high voltage power into low voltage (e.g., 12 [V]) power and supply the low voltage power to each component of the electric vehicle 20. The vehicle control unit functions to maintain the performance of the system regarding the electric vehicle 20 as a whole. The vehicle control unit may perform various functions such as charging and traveling together with various units such as the motor control unit and the battery management system 400.

FIG. 3 is a view showing a circuit configuration of an electric vehicle charging system according to one embodiment of the present invention.

Referring to FIG. 3, the electric vehicle charging system according to the embodiment of the present invention includes electric vehicle supply equipment 10, a connector 51, an inlet 52, and an electric vehicle 20.

First, the electric vehicle supply equipment 10 may include an overload circuit breaker RCBO1 and RCBO2, a power conversion system (PCS), an insulation monitoring unit CT, a communication unit COM1, a plurality of power lines DC+ and DC−, a plurality of signal lines C1 to C6, and an earthing line FE. The plurality of power lines DC+ and DC−, the plurality of signal lines C1 to C6, and the earthing line FE may extend to the electric vehicle 20 by coupling the connector 51 and the inlet 52.

The electric vehicle supply equipment 10 may receive AC power from the power system. The received AC power may pass through the overload circuit breaker RCBO1 and RCBO2. The overload circuit breakers RCBO1 and RCBO2 may function to block reception of the AC power when an overload occurs in the electric vehicle supply equipment 10.

The AC power passing through the overload circuit breaker RCBO1 is input to the power conversion system PCS, and converted into DC power. The power conversion system PCS supplies the DC power to the electric vehicle 20 through two power lines DC+ and DC−. A diode a configured to block a reverse voltage from the electric vehicle 20 may be disposed on a first power line DC+ of the two power lines DC+ and DC−, and a fuse u configured to prevent damage due to the overvoltage applied from the electric vehicle 20 may be disposed on a second power line DC− thereof.

The insulation monitoring unit CT may be disposed between the two power lines DC+ and DC− and the earthing. The insulation monitoring unit CT may monitor an insulation state of the two power lines DC+ and DC−.

A first signal line C1 and a second signal line C2 may refer to signal lines indicating start/stop states of the electric vehicle supply equipment 10. The first signal line C1 and the second signal line C2 may transmit charge sequence signals such as ready to charge and end of charge from the electric vehicle supply equipment 10 to the electric vehicle 20. To this end, a power source having a magnitude of 12 [V] may be connected to one end of the first signal line C1, and an earthing may be connected to one end of the second signal line C2. In addition, two switch units d1 and d2 may be disposed on the first signal line C1 and the second signal line C2, respectively. In the electric vehicle supply equipment 10, the two switch units d1 and d2 may transmit the charge sequence signal to the electric vehicle through an on-off operation.

A third signal line C3 may refer to a signal line indicating a connection state between the connector 51 and the inlet 52. The third signal line C3 may transmit a proximity signal according to the connection state between the connector 51 and the inlet 52. One end of the third signal line C3 may be connected to the second signal line C2.

A fourth signal line C4 may refer to a signal line configured to approve charging permission for the electric vehicle 20. The fourth signal line C4 may transmit a control signal such as start to charge or stop to charge from the electric vehicle 20 to the electric vehicle supply equipment 10. The fourth signal line C4 may be connected to a signal sensing unit j, and the signal sensing unit j may sense a control signal transmitted through the fourth signal line C4.

A fifth signal line C5 and a sixth signal line C6 may refer to signal lines for data communication. The fifth signal line C5 and the sixth signal line C6 may be connected to the communication unit COM1.

Next, the electric vehicle may include a junction box 100, an electric vehicle charging controller 200, and a battery 300. The electric vehicle 20 may include a plurality of power lines DC+ and DC−, a plurality of signal lines C1 to C6, and an earthing line FE.

The junction box 100 may be connected to the two power lines DC+ and DC−. The junction box 100 may include two contactors c disposed on the two power lines DC+ and DC−, respectively. The two contactors may be turned on and off by the electric vehicle charging controller 200. The junction box 100 may be connected to the battery 300 through the two power lines DC+ and DC−, and may transmit DC power received from the electric vehicle supply equipment 10 to the battery 300 to perform charging.

The electric vehicle charging controller 200 may include a relay unit e, a plurality of signal sensing units f, g, and h, a switch k, and a communication unit COM2. The electric vehicle charging controller 200 may be connected to the plurality of signal lines C1 to C6 and the earthing line FE.

The relay unit e may be disposed between a first signal line C1 and a second signal line C2. Specifically, one end of the relay unit e may be connected to the second signal line C2, and the other end may be connected to the first signal line C1. At this time, two contactors c may be connected between the other end of the relay unit e and the first signal line C1. The relay unit e may control the opening and closing of the two contactors c through an opening and closing operation.

A first signal sensing unit f and a second signal sensing unit g are connected to the first signal line C1 and the second signal line C2, respectively. The two signal sensing units f and g may sense a signal generated when the two switch units d1 and d2 provided in the electric vehicle supply equipment 10 are turned on. The two signal sensing units f and g may transmit the sensed signal to a micro-controller, a vehicle control unit, or the like included in the electric vehicle charging controller 200.

The third signal sensing unit h is connected to a third signal line C3. The third signal sensing unit h may sense a signal for sensing a connection state between the connector 51 and the inlet 52.

The switch k is connected to a fourth signal line C4. When the switch k is turned on, a signal notifying the start to charge may be transmitted to the electric vehicle supply equipment 10.

The communication unit COM2 is connected to a fifth signal line C5 and a sixth signal line C6. The communication unit COM2 may communicate with the communication unit COM1 through the fifth signal line C5 and the sixth signal line C6.

FIG. 4 is a view showing a circuit configuration of an electric vehicle charging system according to another embodiment of the present invention.

Referring to FIG. 4, the electric vehicle charging system according to the embodiment of the present invention includes electric vehicle supply equipment 10, a connector 51, an inlet 52, and an electric vehicle 20. The electric vehicle charging system includes a plurality of power lines DC+ and DC−, a plurality of signal lines S+, S−, CC1, CC2, A+, and A−, and an earthing line PE that connect the electric vehicle supply equipment 10, the connector 51, the inlet 52, and the electric vehicle 20. The plurality of power lines DC+ and DC−, the plurality of signal lines S+, S−, CC1, CC2, A+, and A−, and the earthing line PE disposed in the electric vehicle supply equipment 10 and the electric vehicle 20 may be electrically connected by coupling the connector 51 and the inlet 52.

The electric vehicle supply equipment 10 may include first to fourth relays K1 to K4, a first resistor R1, a first earthing power source, a first pull-up power source VP1, and a first charging control unit CONT1. In addition, a first power line DC+, a second power line DC−, first to third signal lines S+, S−, and CC1, fifth and sixth signal lines A+ and A−, and the earthing line PE may be disposed in the electric vehicle supply equipment 10.

The first relay K1 may be disposed on the first power line DC+. The second relay K2 may be disposed on the second power line DC−. DC power may be supplied to the first power line DC+ and the second power line DC− by turning on the first relay K1 and the second relay K2. A positive (+) DC voltage may be applied to the first power line DC+, and a negative (−) DC voltage may be applied to the second power line DC−. A rated voltage applied to each of the first power line DC+ and the second power line DC− may be 750 [V] or 125 [V], and a rated current may be 250 [A].

The first earthing power source may be connected to the earthing line PE.

The first charging control unit CONT1 may be connected to the first signal line S+ and the second signal line S−. The first charging control unit CONT1 may transmit and receive signals related to the charging control to and from a second charging control unit CONT2 of the electric vehicle. Each of the first signal line S+ and the second signal line S− may be a controller area network (CAN) communication line. The first signal line S+ may be a communication line through which a CAN_High signal is transmitted and received, and the second signal line S− may be a communication line through which a CAN_Low signal is transmitted and received. The CAN_High signal and the CAN_Low signal may be differential signals.

The first pull-up power source VP1 may be connected to the third signal line CC1. The first resistor R1 may be disposed on the third signal line CC1. The first resistor R1 may have a first end connected to the first pull-up power source VP1 and a second end connected to the connector 51. The second end of the first resistor R1 may be connected to the first charging control unit CONT1. The first charging control unit CONT1 may receive a sensing signal corresponding to a voltage value of the first end of the first resistor R1. The first resistor R1 may be a pull-up resistor.

The third relay K3 may be disposed on the fifth signal line A+. The fourth relay K4 may be disposed on the sixth signal line A−. As the third relay K3 and the fourth relay K4 are turned on, a signal may be supplied to the fifth signal line A+ and the sixth signal line A−. At this time, the signal may be a charging sequence signal.

The first power line DC+, the second power line DC−, the first to sixth signal lines S+, S−, CC1, CC2, A+, and A−, and the earthing line PE may be disposed on the connector. The first power line DC+, the second power line DC−, the first to third signal lines S+, S−, and CC1, the fifth and sixth signal lines A+ and A−, and the earthing line PE disposed on the connector may extend from the first power line DC+, the second power line DC−, the first to third signal lines S+, S−, and CC1, the fifth and sixth signal lines A+ and A−, and the earthing line PE of the electric vehicle supply equipment 10, respectively.

The connector 51 may include a second resistor R2 and a third resistor R3. The second resistor R2 may be disposed between the earthing line PE and the third signal line CC1. A switch may be disposed between the second resistor R2 and the earthing line PE. The switch may be operated by a mechanical unit disposed outside the connector 51. For example, the switch may be turned on by a user pressing the mechanical unit disposed outside the connector 51. The third resistor R3 may be disposed between the earthing line PE and a fourth signal line CC2.

The first power line DC+, the second power line DC−, the first to sixth signal lines S+, S−, CC1, CC2, A+, and A−, and the earthing line PE may be disposed on the inlet 52. The inlet 52 may include a plurality of connection pins for coupling with the connector 51. The inlet 52 may include connection pins corresponding to each of the first power line DC+, the second power line DC−, the first to sixth signal lines S+, S−, CC1, CC2, A+, and A−, and the earthing line PE. The first power line DC+, the second power line DC−, the first to third signal lines S+, S−, and CC1, the fifth and sixth signal lines A+ and A−, and the earthing line PE disposed on the inlet 52 may extend from the first power line DC+, the second power line DC−, the first and second signal lines S+ and S−, the fourth to sixth signal lines CC2, A+, and A−, and the earthing line PE of the electric vehicle 20, respectively. The third signal line CC1 disposed on the inlet 52 does not extend toward the electric vehicle 20.

The inlet 52 may include a fourth resistor R4. The fourth resistor R4 may be disposed between the earthing line PE and the third signal line CC1.

The electric vehicle 20 may include a junction box 100, an electric vehicle charging controller 200, a battery 300, a fifth resistor R5, a second pull-up power source VP2, and a second earthing power source.

The junction box 100 may include a fifth relay K5 and a sixth relay K6. The fifth relay K5 may be disposed on the first power line DC+. The sixth relay K6 may be disposed on the second power line DC−. As the fifth relay K5 and the sixth relay K6 are turned on, DC power may be supplied to the first power line DC+ and the second power line DC−. A positive (+) DC voltage may be applied to the first power line DC+, and a negative (−) DC voltage may be applied to the second power line DC−. A rated voltage applied to each of the first power line DC+ and the second power line DC− may be 750 [V] or 125 [V], and a rated current may be 250 [A].

The battery 300 may be connected to the first power line DC+ and the second power line DC−, and charged by receiving the DC power.

The second earthing power source may be connected to the earthing line PE.

The second charging control unit CONT2 may be connected to the first signal line S+ and the second signal line S−. The second charging control unit CONT2 may transmit and receive a signal related to the charging control to and from the first charging control unit CONT1 of the electric vehicle supply equipment 10. Each of the first signal line S+ and the second signal line S− may be a controller area network (CAN) communication line. The first signal line S+ may be a communication line through which a CAN_High signal is transmitted and received, and the second signal line S− may be a communication line through which a CAN_Low signal is transmitted and received. The CAN_High signal and the CAN_Low signal may be differential signals.

The second pull-up power source VP2 may be connected to the fourth signal line CC2. The fifth resistor R5 may be disposed on the fourth signal line CC2. The fifth resistor R5 may have a first end connected to the second pull-up power source VP2 and a second end connected to the inlet 52. The second end of the fifth resistor R5 may be connected to the second charging control unit CONT2. The second charging control unit CONT2 may receive a sensing signal corresponding to a voltage value of the second end of the fifth resistor R5. The fifth resistor R5 may be a pull-up resistor.

The second charging control unit CONT2 may be connected to the fifth signal line A+ and the sixth signal line A−. The second charging control unit CONT2 may receive a signal through the fifth signal line A+ and the sixth signal line A−. At this time, the signal may be a charging sequence signal. The charging sequence signal may also be used as a low-voltage auxiliary power source used to drive the second charging control unit CONT2.

FIGS. 5 and 6 are views for describing a process of detecting an earthing line open state in the electric vehicle charging system in FIG. 4.

FIG. 5 shows the flow of a current in a state in which the earthing line PE at the electric vehicle supply equipment 10 side and the earthing line PE at the electric vehicle 20 side are connected. At this time, the switch connected to the first end of the second resistor R2 may be turned off.

Referring to FIG. 5, when the inlet 52 and the connector 51 are coupled and the earthing lines PE are connected to each other, the flow of the current that flows from the first pull-up power source VP1 to the first earthing power source through the first resistor R1 and the fourth resistor R4 is formed. In other words, a closed loop is formed.

The first charging control unit CONT1 may determine whether the connector 51 and the inlet 52 are coupled to each other through the sensing signal corresponding to the voltage value of the second end of the first resistor R1. According to the embodiment, when the sensing signal is sensed, the first charging control unit CONT1 may determine that the connector 51 and the inlet 52 have been coupled through an earthing pin configured to connect the earthing lines PE and a third signal pin configured to connect the third signal lines CC1.

In addition, when the inlet 52 and the connector 51 are coupled and the earthing lines PE are connected to each other, the flow of the current that flows from the second pull-up power source VP2 to the second earthing power source through the fifth resistor R5 and the third resistor R3 is formed. In other words, a closed loop is formed.

The second charging control unit CONT2 may determine whether the connector 51 and the inlet 52 are coupled to each other through the sensing signal corresponding to the voltage value of the second end of the fifth resistor R5. According to the embodiment, when the sensing signal is sensed, the second charging control unit CONT1 may determine that the connector 51 and the inlet 52 have been coupled through the earthing pin configured to connect the earthing lines PE and a fourth signal pin configured to connect the fourth signal lines CC2.

As described above, the first charging control unit CONT1 and the second charging control unit CONT2 may determine whether the connector 51 and the inlet 52 are connected through the presence or absence of the sensing signal transmitted to each of the first charging control unit CONT1 and the second charging control unit CONT2. According to the embodiment, the first charging control unit CONT1 and the second charging control unit CONT2 may determine whether the connector 51 and the inlet 52 are connected through the presence or absence of the sensing signal transmitted to each of the first charging control unit CONT1 and the second charging control unit CONT2.

FIG. 6 shows the flow of the current in a state in which the earthing line PE at the electric vehicle supply equipment 10 side and the earthing line PE at the electric vehicle side are open.

In a state in which the connector 51 and the inlet 52 are coupled and the switch connected to the first end of the second resistor R2 is turned off, any one of the first charging control unit CONT1 and the second charging control unit CONT2 may not receive the sensing signal when any one of the earthing line PE, the third signal line CC1, and the fourth signal line CC2 is not electrically connected. For example, when the earthing line PE is not connected, both the first charging control unit CONT1 and the second charging control unit CONT2 may not receive the sensing signal. As another example, when the third signal line CC1 is not connected, the first charging control unit CONT1 may not receive the sensing signal. As another example, when the fourth signal line CC2 is not connected, the second charging control unit CONT2 may not receive the sensing signal. The first charging control unit CONT1 and the second charging control unit CONT2 may determine the connection state between the connector 51 and the inlet 52, respectively, based on whether the sensing signal is received. In this case, the first charging control unit CONT1 and the second charging control unit CONT2 may not determine which part of the earthing line PE, the first signal line CC1, and the second signal line CC2 has been open.

However, as shown in FIG. 6, when the connector 51 and the inlet 52 are coupled and the switch connected to the first end of the second resistor R2 is turned on, the second charging control unit CONT2 may receive the sensing signal even when the inlet 52 and the connector 51 are not coupled and thus the connection between the earthing lines PE is open. This is because the flow of the current that flows from the first pull-up power source VP1 to the second earthing power source through the first resistor R1 and the second to fourth resistors R2 to R4 is formed. In other words, a closed loop is formed.

As described above, since the closed loop is formed even when the earthing lines PE are not connected, a problem may occur in that the second charging control unit CONT2 determines that the earthing line PE at the electric vehicle supply equipment 10 side and the earthing line PE at the electric vehicle side have been connected through the sensing signal corresponding to the voltage value of the second end of the fifth resistor R5.

FIG. 7 is a view schematically showing the electric vehicle charging system according to the embodiment of the present invention.

The electric vehicle charging system according to the embodiment of the present invention may include electric vehicle supply equipment 10 and a connector 51. The electric vehicle supply equipment 10 and the connector 51 may be connected through a cable.

The electric vehicle charging system according to the embodiment of the present invention may include an inlet 52 and an electric vehicle 20. The inlet 52 may be integrally formed by being included in the electric vehicle. Here, the inlet 52 and the electric vehicle may be collectively referred to as an electric vehicle charger.

The electric vehicle supply equipment 10 may include first to fourth relays K1 to K4, a first resistor R1, a first earthing power source, a pull-up power source VP1, and a charging control unit CONT1. In addition, a first power line DC+, a second power line DC−, a first signal line CC1, third to sixth signal lines A+, A−, S+, and S−, and an earthing line PE may be disposed in the electric vehicle supply equipment 10.

The first relay K1 may be disposed on the first power line DC+. The second relay K2 may be disposed on the second power line DC−. DC power may be supplied to the first power line DC+ and the second power line DC− by turning on the first relay K1 and the second relay K2. A positive (+) DC voltage may be applied to the first power line DC+, and a negative (−) DC voltage may be applied to the second power line DC−. A rated voltage applied to each of the first power line DC+ and the second power line DC− may be 750 [V] or 125 [V], and a rated current may be 250 [A].

The first earthing power source may be connected to the first earthing line PE.

The pull-up power source VP1 may be connected to the first signal line CC1. The first resistor R1 may be disposed on the first signal line CC1. The first resistor R1 may have a first end connected to the pull-up power source VP1 and a second end connected to the connector 51. The second end of the first resistor R1 may be connected to the charging control unit CONT1. The charging control unit CONT1 may receive a sensing signal corresponding to a voltage value of the first end of the first resistor R1.

The third relay K3 may be disposed on the third signal line A+. The fourth relay K4 may be disposed on the fourth signal line A−. As the third relay K3 and the fourth relay K4 are turned on, a third signal and a fourth signal may be supplied to the third signal line A+ and the fourth signal line A−, respectively. At this time, each of the third signal and the fourth signal may be a charging sequence signal.

The charging control unit CONT1 may be connected to the fifth signal line S+ and the sixth signal line S−. The charging control unit CONT1 may transmit and receive a signal related to the charging control to and from an electric vehicle charging controller 200 of the electric vehicle 20. Each of the fifth signal line S+ and the sixth signal line S− may be a controller area network (CAN) communication line. The fifth signal line S+ may be a communication line through which a CAN_High signal is transmitted and received, and the sixth signal line S− may be a communication line through which a CAN_Low signal is transmitted and received. The CAN_High signal and the CAN_Low signal may be differential signals.

The first power line DC+, the second power line DC−, the first to sixth signal lines CC1, CC2, A+, A−, S+, and S−, and the earthing line PE may be disposed on the connector 51. The first power line DC+, the second power line DC−, the first signal line CC1, the third to sixth signal lines A+, A−, S+, and S−, the earthing line PE disposed on the connector 51 may extend from the first power line DC+, the second power line DC−, the first signal line CC1, the third to sixth signal lines A+, A−, S+, and S−, and the earthing line PE of the electric vehicle supply equipment 10, respectively.

The connector 51 may include a third resistor R3 and a second resistor R2. The third resistor R3 may be disposed between the earthing line PE and the second signal line CC2. The third resistor R3 may be disposed between the earthing line PE and the first signal line CC1. A switch may be disposed between the second resistor R2 and the earthing line PE. The switch may be operated by a mechanical unit disposed outside the connector 51. For example, the switch may be turned on by a user pressing the mechanical unit disposed outside the connector 51.

The first power line DC+, the second power line DC−, the first to sixth signal lines CC1, CC2, A+, A−, S+, and S−, and the earthing line PE may be disposed on the inlet 52. The first power line DC+, the second power line DC−, the second to sixth signal lines CC2, A+, A−, S+, and S−, and the earthing line PE disposed on the inlet 52 may extend from the first power line DC+, the second power line DC−, the second to sixth signal lines CC2, A+, A−, S+, and S−, and the earthing line PE of the electric vehicle 20, respectively. The first signal line CC1 disposed on the inlet 52 does not extend toward the electric vehicle.

The inlet 52 may include a plurality of connection pins P1 to P9 for coupling with the connector 51. The inlet 52 may include connection pins corresponding to each of the first power line DC+, the second power line DC−, the first to sixth signal lines CC1, CC2, A+, A−, S+, and S−, and the earthing line PE. The connection pins may include a first power pin P1, a second power pin P2, first to sixth signal pins P4 to P9, and an earthing pin P3.

The earthing pin P3 may be coupled to the connector 51 to connect the first earthing line PE connected to the first earthing power source at the electric vehicle supply equipment 10 side and the second earthing line PE connected to a second earthing power source at the electric vehicle 20 side. The first signal pin P6 may be coupled to the connector 51 to connect the first signal line CC1 at the electric vehicle supply equipment 10 side and the first signal line CC1 at the electric vehicle 20 side. The second signal pin P7 may be coupled to the connector 51 to connect the second signal line CC2 at the electric vehicle supply equipment 10 side and the second signal line CC2 at the electric vehicle 20 side. The third signal pin P8 may be coupled to the connector 51 to connect the third signal line A+ at the electric vehicle supply equipment 10 side and the third signal line A+ at the electric vehicle 20 side. The fourth signal pin P9 may be coupled to the connector 51 to connect the fourth signal line A− at the electric vehicle supply equipment 10 side and the fourth signal line A− at the electric vehicle 20 side. The first power pin P1 may be coupled to the connector 51 to connect the first power line DC+ at the electric vehicle supply equipment 10 side and the first power line DC+ at the electric vehicle 20 side. The second power pin P2 may be coupled to the connector 51 to connect the second power line DC− at the electric vehicle supply equipment 10 side and the second power line DC− at the electric vehicle 20 side. The fifth signal pin P4 may be coupled to the connector 51 to connect the fifth signal line S+ at the electric vehicle supply equipment 10 side and the fifth signal line S+ at the electric vehicle 20 side. The sixth signal pin P5 may be coupled to the connector 51 to connect the sixth signal line S− at the electric vehicle supply equipment 10 side and the sixth signal line S− at the electric vehicle 20 side.

The inlet 52 may include a signal unit 53. The signal unit 53 may be disposed between the second signal line CC2 and the third signal line A+, and may generate a second signal and transmit the second signal to the electric vehicle charging controller 200. The signal unit 53 may include a fifth resistor R5. The fifth resistor R5 may have a first end connected to the third signal line A+ and a second end connected to the second signal line CC2. A voltage may be applied to the first end of the fifth resistor R5 from the third signal line A+. The voltage applied from the third signal line A+ may be a pull-up power source, and the fifth resistor R5 may be a pull-up resistor.

The inlet 52 may include a fourth resistor R4. The fourth resistor R4 may be disposed between the earthing line PE and the first signal line CC1.

The electric vehicle 20 may include a junction box 100, the electric vehicle charging controller 200, a battery 300, a second pull-up power source VP1, and the second earthing power source.

The junction box 100 may include a fifth relay K5 and a sixth relay K6. The fifth relay K5 may be disposed on the first power line DC+. The sixth relay K6 may be disposed on the second power line DC−. As the fifth relay K5 and the sixth relay K6 are turned on, DC power may be supplied to the first power line DC+ and the second power line DC−. A positive (+) DC voltage may be applied to the first power line DC+, and a negative (−) DC voltage may be applied to the second power line DC−. A rated voltage applied to each of the first power line DC+ and the second power line DC− may be 750 [V] or 125 [V], and a rated current may be 250 [A].

The battery 300 may be connected to the first power line DC+ and the second power line DC−, and charged by receiving the DC power.

The second earthing power source may be connected to the second earthing line PE.

The electric vehicle charging controller 200 may be connected to the fifth signal line S+ and the sixth signal line S−. The electric vehicle charging controller 200 may transmit and receive a signal related to the charging control to and from the charging control unit CONT1 of the electric vehicle supply equipment 10. Each of the fifth signal line S+ and the sixth signal line S− may be a controller area network (CAN) communication line. The fifth signal line S+ may be a communication line through which a CAN_High signal is transmitted and received, and the sixth signal line S− may be a communication line through which a CAN_Low signal is transmitted and received. The CAN_High signal and the CAN_Low signal may be differential signals.

The electric vehicle charging controller 200 may be connected to the second signal line CC2. The electric vehicle charging controller 200 may be connected to the signal unit of the inlet 52 through the second signal line CC2.

The electric vehicle charging controller 200 may be connected to the third signal line A+ and the fourth signal line A−. The electric vehicle charging controller 200 may receive a signal through the third signal line A+ and the fourth signal line A−. At this time, the signal may be a charging sequence signal. The charging sequence signal may be used as a low-voltage auxiliary power source used to drive the electric vehicle charging controller 200.

The electric vehicle charging controller 200 may include a sensing unit 210. The sensing unit 210 may be connected to the electric vehicle supply equipment 10 through the third signal line A+ and the fourth signal line A− to receive the third signal and the fourth signal.

The sensing unit 210 may include a first processing unit, a second processing unit, and an insulation unit. The first processing unit may be electrically connected to the electric vehicle supply equipment 10 through the third signal line A+ and the fourth signal line A−, and may receive the third signal and the fourth signal from the electric vehicle supply equipment 10. The second processing unit may receive the third signal and the fourth signal received by the first sensing unit 210 and transmit the received third and fourth signals to the control unit. The insulation unit may electrically isolate the first processing unit and the second processing unit. The insulation unit may convert the third signal and the fourth signal received from the first processing unit from an electrical signal to an optical signal, and then convert the third signal and the fourth signal from the optical signal to the electrical signal to transmit the converted third and fourth signals to the second processing unit. The insulation unit may be electrically connected to the second earthing power source. The insulation unit may include an optocoupler.

The electric vehicle charging controller 200 may further include a control unit (not shown). The control unit may determine whether the earthing line PE at the electric vehicle supply equipment 10 side and the earthing line PE at the electric vehicle side have been connected based on the second signal. Specifically, when a magnitude of a voltage of the second signal is greater than a first voltage value and smaller than or equal to a second voltage value, the control unit may determine that the first earthing line PE and the second earthing line PE have been connected. When the magnitude of the voltage of the second signal is greater than the second voltage value and smaller than a third voltage value, the control unit may determine that the earthing line PE at the electric vehicle supply equipment 10 side and the earthing line PE at the electric vehicle side have not been connected. The third voltage value may be smaller than a magnitude of a voltage of the third signal. According to another embodiment of the present invention, the control unit may also be included in the battery management system.

FIG. 8 is a view showing a circuit configuration of the sensing unit according to the embodiment of the present invention.

Referring to FIG. 8, the sensing unit 210 may include a first processing unit 211, a second processing unit 213, and an insulation unit 212.

The first processing unit 211 may include first to third diodes D1 to D3. The first processing unit 211 may include sixth to ninth resistors R6 to R9.

The first diode D1 may control the magnitude of the voltage of the third signal received through the third signal line A+ to be smaller than or equal to a preset value. The first diode D1 may have a first end connected to the third signal line A+ and a second end connected to an anode terminal of a second diode D2. The second end of the first diode D1 may be connected to the second earthing power source. The first diode D1 may be a transient voltage suppressor (TVS) diode. According to one embodiment, the first diode D1 may block a voltage of 30 [V] or more from being input through the third signal line A+.

The second diode D2 may block a reverse voltage applied to the electric vehicle supply equipment 10 through the third signal line A+. The second diode D2 may have an anode terminal connected to the third signal line A+ and a cathode terminal connected to the sixth resistor R6.

The third diode D3 may block a reverse voltage applied to the electric vehicle charging controller 200 through the fourth signal line A−. A cathode terminal of the third diode D3 may be connected to the fourth signal line A− and an anode terminal thereof may be connected to the insulation unit 212.

The sixth resistor R6 may have a first end connected to the cathode terminal of the second diode D2. The sixth resistor R6 may have the first end connected to a first end of an eighth resistor R8. The sixth resistor R6 may have a second end connected to a first end of the seventh resistor R7.

The seventh resistor R7 may have the first end connected to the second end of the sixth resistor R6 and a second end connected to the insulation unit 212.

The eighth resistor R8 may have the first end connected to the cathode terminal of the second diode D2. The eighth resistor R8 may have the first end connected to the first end of the sixth resistor R6. The eighth resistor R8 may have a second end connected to a first end of the ninth resistor R9.

The ninth resistor R9 may have the first end connected to the second end of the eighth resistor R8 and a second end connected to the insulation unit 212.

The second processing unit 213 may include a relay K7, a first switching element SW1, a second switching element SW2, first to fourth capacitors C1 to C4, and tenth to thirteenth resistors R10 to R13.

A first end of the relay K7 may be connected to a power source unit VCC and a second end thereof may be connected to the insulation unit 212. The power source unit VCC may be a power source disposed in the electric vehicle. Depending on an on-off state of the relay K7, the insulation unit 212 may receive power required for driving.

The first switching element SW1 may have a first end connected to the second end of the relay K7, a second end connected to a first end of the tenth resistor R10, and a third end connected to the insulation unit 212. The first switching element SW1 may be a field effect transistor (FET). The first switching element SW1 may be a bipolar junction transistor (BJT). In this case, the first switching element SW1 may have an emitter terminal connected to the second end of the relay K7, a collector terminal connected to the first end of the tenth resistor R10, and a base terminal connected to the insulation unit 212.

The second switching element SW2 may have a first end connected to the insulation unit 212, a second end connected to a first end of a twelfth resistor R12, and a third end connected to the insulation unit 212. The second switching element SW2 may be a field effect transistor (FET). The second switching element SW2 may be a bipolar junction transistor (BJT). In this case, the second switching element SW2 may have an emitter terminal connected to the insulation unit 212, a collector terminal connected to the first end of the twelfth resistor R12, and a base terminal connected to the insulation unit 212.

The first capacitor C1 may have a first end connected to the first end of the first switching element SW1 and a second end connected to a second earthing terminal.

The second capacitor C2 may have a first end connected to the first end of the first switching element SW1. The second capacitor C2 may have the first end connected to the first end of the second switching element SW2. The second capacitor C2 may have a second end connected to the second earthing terminal.

The third capacitor C3 may have a first end connected to the first end of the tenth resistor R10 and a second end connected to the second earthing terminal.

The fourth capacitor C4 may have a first end connected to the first end of the twelfth resistor R12 and a second end connected to the second earthing terminal.

The tenth resistor R10 may have the first end connected to the second end of the first switching element SW1 and a second end connected to the second earthing terminal.

The eleventh resistor R11 may have a first end connected to the first end of the tenth resistor R10 and a second end connected to the control unit.

The twelfth resistor R12 may have the first end connected to the second end of the second switching element SW2 and a second end connected to the second earthing terminal.

The thirteenth resistor R13 may have a first end connected to the first end of the twelfth resistor R12 and a second end connected to the control unit.

The insulation unit 212 may include an optocoupler. The optocoupler may be isolated into an input side and an output side. The optocoupler may have the input side and the output side that are electrically isolated. The optocoupler may include four terminals (first to fourth terminals) at the input side and four terminals (fifth to eighth terminals) at the output side. The optocoupler may have the four terminals at the input side and the four terminals at the output side that are electrically isolated. Input sides of the first processing unit 211 and the insulation unit 212 connected to the third signal line A+ and the fourth signal line A− are electrically isolated from output sides of the second processing unit 213 and the insulation unit 212.

A first terminal of the optocoupler may be connected to the second end of the seventh resistor R7. A second terminal of the optocoupler may be connected to the second earthing power source. A third terminal of the optocoupler may be connected to the anode terminal of the third diode D3. A fourth terminal of the optocoupler may be connected to the third end of the ninth resistor R9.

A fifth terminal of the optocoupler may be connected to the second end of the relay K7 and the first end of the first switching element SW1. A sixth terminal of the optocoupler may be connected to the third end of the first switching element SW1. A seventh terminal of the optocoupler may be connected to the third end of the second switching element SW2. An eighth terminal of the optocoupler may be connected to the second earthing power source.

FIGS. 9 and 10 are views for describing a configuration of a closed loop when a first earthing line and a second earthing line according to the embodiment of the present invention are connected.

Referring to FIGS. 9 and 10, the second earthing power source connected to the second earthing line PE at the electric vehicle 20 side and the second earthing power source connected to the input side of the optocoupler 212 may be the same earthing power source. Accordingly, a current passing through the sixth resistor R6, the seventh resistor R7, the second diode D2, the fifth resistor R5, and the third resistor R3 of the optocoupler 212 may be generated. In other words, a closed loop may be formed. A voltage supplied to the closed loop may be supplied from the third signal line A+ connected to the second end of the fifth resistor R5. At this time, the switch connected to the first end of the third resistor R2 may be turned off.

Since the input side of the optocoupler 212 is electrically isolated from the output side of the optocoupler 212, the closed loop may not be affected by other voltage sources or the like applied to the electric vehicle charging controller 200. Accordingly, a sensing signal sensed at the second end of the fifth resistor R5 corresponding to the state in which the first earthing line PE and the second earthing line PE are connected may have a constant voltage value.

FIG. 11 is a view for describing a sensing signal received by a control unit according to FIGS. 9 and 10.

FIG. 11A shows a schematic circuit diagram for describing the formation of the sensing signal, and FIG. 11B shows an example of the voltage range of the sensing signal when the first earthing line PE and the second earthing line PE are connected.

As shown in FIG. 11A, the sensing signal may be generated between the fifth resistor R5 and the third resistor R3. The sensing signal may have a voltage value obtained by voltage-dividing the voltage supplied from the third signal line A+ by the fifth resistor R5 and the third resistor R3. The sensing signal may be transmitted to the electric vehicle charging controller 200. The sensing signal may be transmitted to the control unit of the electric vehicle charging controller 200.

As shown in FIG. 11B, the control unit may determine that the first earthing line PE and the second earthing line PE are connected when the sensing signal is included in a predetermined voltage range. According to the embodiment, when the voltage range is greater than a first voltage value (e.g., 1.9 [V]) and smaller than or equal to a second voltage value (e.g., 3.1 [V]), the control unit may determine that the first earthing line PE and the second earthing line PE have been connected.

FIGS. 12 and 13 are views for describing a configuration of the closed loop when the first earthing line PE and the second earthing line PE according to the embodiment of the present invention are open.

Referring to FIGS. 12 and 13, since the earthing pin of the inlet 52 is not connected to the optocoupler 212, the first earthing line PE and the second earthing line PE may be open. Accordingly, equipotential bonding may not be performed between the first earthing power source and the second earthing power source.

In this case, as shown in FIGS. 12 and 13, a current passing through the second to fifth resistors R2 to R5, the optocoupler 212, the sixth resistor R6, the seventh resistor R7, and the second diode D2 may be generated. Since the second earthing power source connected to the second earthing line PE and the second earthing power source connected to the input side of the optocoupler 212 may be the same earthing power source, a closed loop may be formed. A voltage supplied to the closed loop may be supplied from the third signal line A+ connected to the second end of the fifth resistor R5. At this time, the switch connected to the first end of the second resistor R2 may be turned on.

Since the input side of the optocoupler 212 is electrically isolated from the output side of the optocoupler 212, the closed loop may not be affected by other voltage sources or the like applied to the electric vehicle charging controller 200. Accordingly, the sensing signal sensed at the second end of the fifth resistor R5 may have a constant voltage value in response to the state in which the first earthing line PE and the second earthing line PE are open.

FIG. 14 is a view for describing a sensing signal received by the control unit according to FIGS. 12 and 13.

FIG. 14A shows a schematic circuit diagram for describing the formation of the sensing signal, and FIG. 14B shows an example of the voltage range of the sensing signal when the first earthing line PE and the second earthing line PE are open.

As shown in FIG. 14A, the sensing signal may be generated between the fifth resistor R5 and the third resistor R3. The sensing signal may have a voltage value obtained by voltage-dividing the voltage supplied from the third signal line A+ by the fifth resistor R5 and the second to fourth resistors R2 to R4. The sensing signal may be transmitted to the electric vehicle charging controller 200. The sensing signal may be transmitted to the control unit of the electric vehicle charging controller 200.

As shown in FIG. 14B, when the sensing signal is included in a predetermined voltage range, the control unit may determine that the first earthing line PE and the second earthing line PE will be connected. According to the embodiment, when the voltage range is greater than the second voltage value (e.g., 3.1 [V]) and smaller than or equal to a third voltage value (e.g., 4.3 [V]), the control unit may determine that the first earthing line PE and the second earthing line PE has been open.

Although the embodiments have been mainly described above, this is merely illustrative and does not limit the present invention, and those skilled in the art to which the present invention pertains will be able to understand that various modifications and applications not exemplified above are possible without departing from the essential characteristics of the embodiments. For example, each component specifically shown in the embodiment may be implemented by modification. In addition, differences related to the modifications and applications should be construed as being included in the scope of the present invention defined in the appended claims.

The invention claimed is:

1. An electric vehicle charger comprising an electric vehicle charging controller including:
an inlet including an earthing pin coupled to a coupler and configured to connect a first earthing line connected to a first earthing power source at electric vehicle supply equipment and a second earthing line connected to a second earthing power source at an electric vehicle,
a first signal pin coupled to the coupler and configured to connect a first signal line at the electric vehicle supply equipment and a first signal line at the electric vehicle, and
a second signal pin coupled to the coupler and configured to connect a second signal line at the electric vehicle supply equipment and a second signal line at the electric vehicle; and
a sensing unit connected to the electric vehicle supply equipment through a third signal line and a fourth signal line so as to receive a third signal and a fourth signal,
wherein the inlet includes a signal unit disposed between the second signal line and the third signal line, and configured to generate a second signal and transmit the second signal to the electric vehicle charging controller, and
the sensing unit includes:
a first processing unit electrically connected to the electric vehicle supply equipment through the third signal line and the fourth signal line, and configured to receive the third signal and the fourth signal from the electric vehicle supply equipment;
a second processing unit configured to receive the third signal and the fourth signal that the first processing unit has received, and transmit the third signal and the fourth signal to a control unit; and
an insulation unit configured to electrically isolate the first processing unit and the second processing unit.

2. The electric vehicle charger of claim 1, wherein the insulation unit converts the third signal and the fourth signal received from the first processing unit from an electrical signal to an optical signal, and then converts the third signal and the fourth signal from the optical signal to the electrical signal to transmit the converted third signal and fourth signal to the second processing unit.

3. The electric vehicle charger of claim 2, wherein the insulation unit is electrically connected to the second earthing power source.

4. The electric vehicle charger of claim 2, wherein the insulation unit includes an optocoupler.

5. The electric vehicle charger of claim 2, wherein the first processing unit includes:
a first diode configured to control a magnitude of a voltage of the third signal received through the third signal line to a preset value or less;
a second diode configured to block a reverse voltage applied to the electric vehicle supply equipment through the third signal line; and
a third diode configured to block a reverse voltage applied to the electric vehicle charging controller through the fourth signal line.

6. The electric vehicle charger of claim 1, wherein the signal unit includes a first resistor having a first end connected to the third signal line, and a second end connected to the second signal line.

7. The electric vehicle charger of claim 6, wherein the coupler includes a second resistor having a first end connected to the second signal line, and a second end connected to the earthing line, and
when the first earthing line and the second earthing line are connected, a current passing through the first resistor and the second resistor is generated.

8. The electric vehicle charger of claim 7, wherein the coupler includes a third resistor having a first end connected to the earthing line, and a second end connected to the first signal line,
the inlet includes a fourth resistor having a first end connected to the first signal line, and a second end connected to the earthing line, and
a current passing through the first to fourth resistors in the control unit when the first earthing line and the second earthing line are open.

9. The electric vehicle charger of claim 1, wherein when a magnitude of a voltage of the second signal is greater than a first voltage value and smaller than or equal to a second voltage value, the control unit determines that the first earthing line and the second earthing line are connected.

10. The electric vehicle charger of claim 9, wherein when the magnitude of the voltage of the second signal is greater than the second voltage value and smaller than a third voltage value, the control unit determines that the earthing line at the electric vehicle supply equipment and the earthing line at the electric vehicle are not connected.

* * * * *